United States Patent Office 2,953,217
Patented Sept. 20, 1960

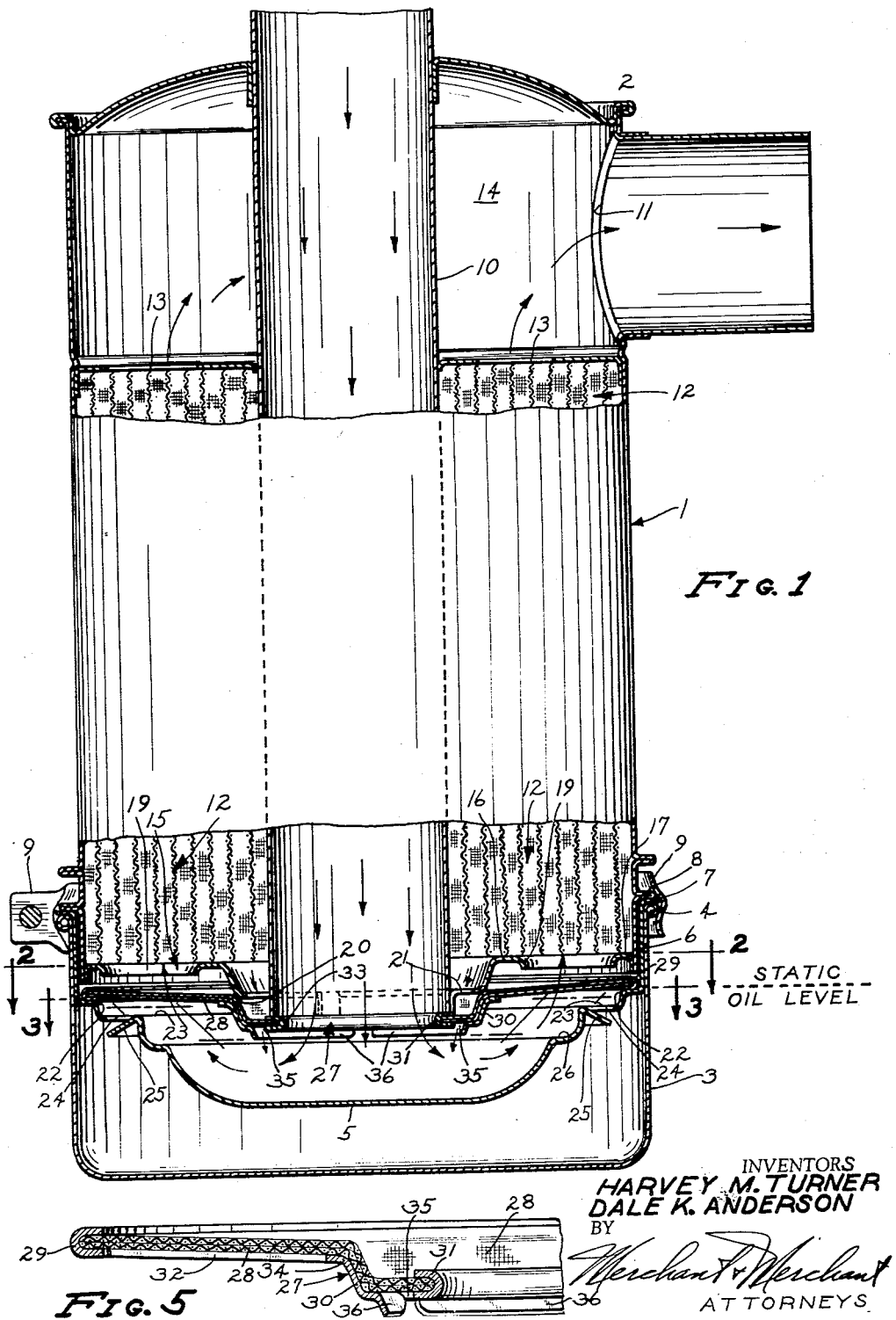

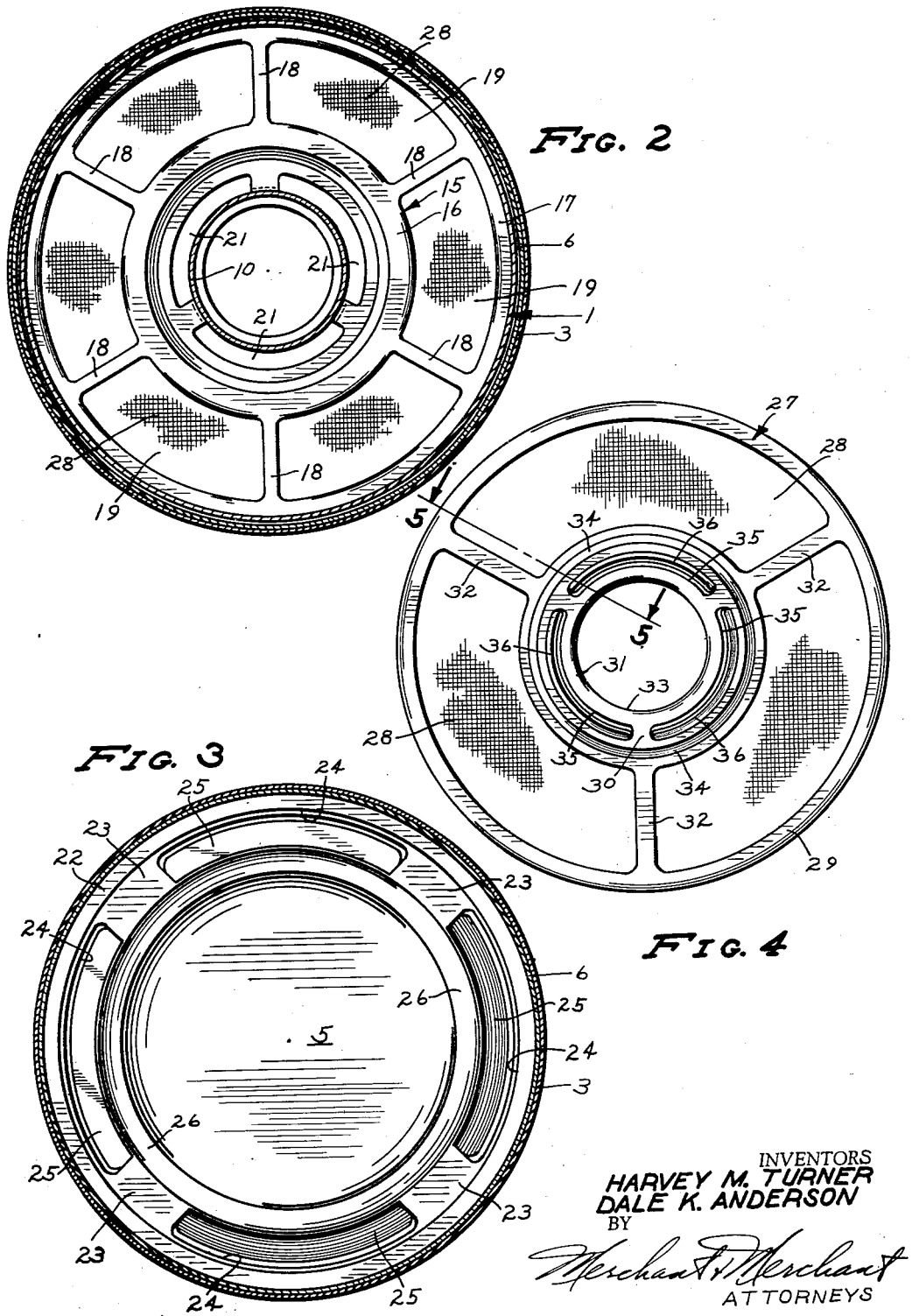

2,953,217

WET TYPE AIR CLEANER WITH OPTIONALLY USABLE AUXILIARY FILTER

Harvey M. Turner and Dale K. Anderson, St. Paul, Minn., assignors to Donaldson Company, Inc., St. Paul, Minn., a corporation of Delaware Filed Feb. 24, 1959, Ser. No. 795,278

13 Claims. (Cl. 183—15)

Our present invention relates to improvements in air cleaners of the so-called wet type which comprise a liquid reservoir that is normally filled with liquid, usually oil, to a predetermined static level. This general type of cleaner, while suitable for a wide variety of applications, is most commonly used in connection with the air intake systems of internal combustion engines such as are commonly employed in various types of over-the-road and off-the-road tractors and other motor-driven vehicles. In air cleaners of this general character the contaminated air is generally discharged downwardly into the liquid reservoir of the cleaner where it picks up oil and carries it into a filter-equipped expansion chamber in which the contaminated air and liquid are thoroughly mixed; the earthen dust and similar commonly encountered contaminants become entrapped in the liquid and the now contaminated liquid being separated from the air; the clean air being passed to the cleaner's outlet and the contaminated liquid being returned to the cleaner's reservoir for settling out of the contaminants and re-entrainment with the air stream passing through the reservoir. Through the incorporation of now well recognized design expedients commercial cleaners of this general character are presently available wherein a relatively continuous circulation of liquid through the cycle above described is maintained under widely varying air velocity conditions created by varying engine loads. In a general way it may be said that this relatively continuous circulation of liquid from the reservoir to and through the filter chamber and back to the reservoir is maintained and controlled, in whole or in part, by what may be referred to as a balancing of air pressures between spaced areas above and below the said filter element.

Generally stated, most of the recent commercially built air cleaners of this general character have proven quite satisfactory under the most generally encountered air conditions when the air-borne contaminants consist largely or wholly of earthen dust particles, but have proven troublesome and generally unsatisfactory under less frequently encountered, relatively abnormal air conditions more or less peculiar to certain localities and to certain relatively brief periods during the year when the air contaminants comprise, in addition to the customary encountered earthen dust, a relatively high percentage of fibrous vegetable components consisting of fine chaff and cotton-like fibers. In such cleaners the earthen dust is continuously washed out of the filter element and carried back to and deposited in the cleaner's liquid reservoir, but the fibrous material tends to become permanently lodged in the cleaner's filter element, thereby progressively restricting and ultimately plugging the same. Because the filter elements of such cleaners are generally of considerable depth, it is very difficult and often impossible to thoroughly cleanse the same of this collected fibrous material. In an attempt to alleviate this problem the filters of some previous cleaners of this general character have been provided with displaceable sections or portions adjacent their intake ends which could be removed and cleaned independently of the main filter body and which were intended to entrap fibrous material before it entered the main filter body. In general, however, such attempts have failed to provide a satisfactory solution to the described problem for the following reasons:

(a) Displaceable sections or portions forming the intake end of the filter actually comprise a permanent working part of the filter unit and if made fine enough to positively filter out all of the fibrous material these displaceable filter sections impose an objectionably high restriction to the flow of air through the cleaner, resulting in a permanent sacrifice of engine efficiency just for the purpose of taking care of a condition encountered only occasionally and for rather brief periods in some geographical locations and never or seldom encountered in other geographical locations.

(b) On the other hand, if these independently removable filter intake sections or portions are made coarse enough as to impose no objectionable air flow restriction then the primary purpose thereof, namely the removal of all fibrous material before it reached and became lodged in the main body of the filter, is defeated.

(c) In practice, the design factors responsible for producing a pressure balance between spaced points, one in the filter-equipped chamber and the other within the reservoir below the filter, such as will maintain a relatively constant circulation of liquid from the reservoir to and through the filter and back to the reservoir, are established on the basis of the overall air flow restrictions imposed by the entire filter. Hence, it has hitherto not been practical to operate such cleaners with the displaceable intake end sections or portions thereof removed, since this would upset the pressure balance responsible for relatively continuous circulation of liquid through the filter unit.

In the light of the above, an important objective of the instant invention is in the provision of an improved air cleaner structure of the general character described in which the filter comprises a main filter body of considerable depth and an optionally usable auxiliary intake filter unit, together with means whereby the above described pressure balance, necessary to insure a relatively constant circulation of liquid from the reservoir into and out of the main filter body to the reservoir, will be automatically obtained both in the presence of and in the absence of the auxiliary filter unit.

Preferably, and as illustrated herein, the air cleaner is primarily designed to provide the proper air pressure balance and operating conditions in the absence of the auxiliary, optionally usable filter and, under all normal or usual conditions when the air contamination consists largely of earthen dust, the cleaner will be operated without the auxiliary filter. The auxiliary filter is generally installed only during exceptional or abnormal periods when the air is contaminated with fibrous type substances such as tend to become permanently lodged in the main body of the filter if allowed to enter the same. This optionally usable auxiliary filter is sufficiently fine to remove all of the objectionable fibrous material before it reaches the main body of the filter, is readily removed for cleaning and, under the abnormal conditions described, will be frequently removed and cleaned. This auxiliary filter does provide a considerable restriction to over all air flow through the cleaner which does somewhat reduce the efficiency of the engine, but this only for the generally brief periods during which its presence is demanded. Also, this added restriction to air flow imposed by this auxiliary filter unit tends to upset the air pressure balance necessary to the maintenance of the relatively constant circulation of liquid. However, as an important feature of the invention, the auxiliary filter unit is provided with built-in means for re-establishing, upon installation thereof, an air pressure balance necessary to provide the required liquid circulation in the presence of the added air flow restriction imposed thereon.

The above and other highly important objects and advantages of our invention will become apparent from the following detailed specification, appended claims and attached drawings.

In the accompanying drawings, like characters indicate like parts throughout the several views.

Referring to the drawings:

Fig. 1 is a view in side elevation, with some parts broken away and some parts shown in axial section, of an air cleaner incorporating a preferred embodiment of the invention;

Fig. 2 is a horizontal sectional view taken on the line 2—2 of Fig. 1;

Fig. 3 is a horizontal sectional view taken on the line 3—3 of Fig. 1;

Fig. 4 is a plan view of the auxiliary filter element removed from the cleaner body; and Fig. 5 is an enlarged fragmentary transverse sectional view through the auxiliary filter taken on the line 5—5 of Fig. 4.

The air cleaner illustrated in the drawings is of the so-called wet type. The outer shell of this cleaner comprises a generally vertically disposed tubular body section 1 permanently closed at its upper end by a head 2 and normally closed at its lower end by a downwardly displaceable cup-like bottom section 3. The displaceable cup-like bottom section 3 serves as a liquid reservoir and is normally filled with a suitable liquid, usually engine oil, to the approximate level indicated by the dotted line marked "Static Oil Level" on Fig. 1. This cup-like bottom section 3, which may sometimes hereinafter be referred to as an outer cup, is provided at its upper end with a bead 4 and is telescopically applied over the lower end portion of the tubular main body section 1. In the preferred structure illustrated, the inner cup 5 is disposed within the outer cup 3 and has an upstanding tubular outer wall portion 6 that is snugly telescopically applied in the upper portion of the outer cup 3 and provided with an outturned flange 7 seated on the bead 4 of the outer cup 3. The outer cup 3 and the inner cup 5 are together telescopically applied over the lower end portion of the tubular main body section 1 to the maximum extent permitted by a stop flange 8 on the bottom section 1. The inner and outer cups 3 and 5, respectively, are downwardly displaceable from the main body section 1 as a unit and the inner cup 5 is thereafter upwardly displaceable from the outer cup 3. The inner and outer cups 3 and 5 are normally securely but detachably anchored in the position shown by suitable anchoring means such as a split clamping band or the like 9. Extending axially downwardly through the tubular main body section of the outer shell and through the head 2 thereof is a tubular central air intake conduit 10 whose lower discharge end is disposed within the liquid reservoir defined by the outer cup 3 and somewhat below the static fluid level indicated on Fig. 1 being coincident with section line 3—3. The air intake conduit 10 may receive air directly from atmosphere or indirectly from atmosphere from a suitable precleaner, not shown, and the upper portion of the tubular main body section 1 is provided with a coupling sleeve equipped clean air outlet port 11 which will usually be connected to an air-consuming device, such as an air intake system of an internal combustion engine, not shown. The annular space radially outwardly of that portion of the air intake conduit 10 lying between its lower discharge end and the approximate plane of the bottom of the clean air discharge port 11 provides an annular air filtering and liquid-condensing chamber leading upwardly from the liquid reservoir defined by the outer cup 3.

Disposed in and filling all but the lower portion of this annular air filtering and liquid-condensing chamber, which chamber may also sometimes be referred to as an expansion chamber, is a main filter unit or body, indicated as an entirety by 12, which may take various forms but which may be of the form or character disclosed more fully in the Fier Patent 2,701,029 of February 1, 1955. Briefly stated, this preferred filtering unit comprises a sheet of woven wire having herringbone shaped corrugations extending generally vertically. The upper end of this main filter unit 12 is snugly seated against a suitably apertured header 13 rigidly secured to the shell section 1. The annular space between the header 13 and the head 2 comprises an air outlet chamber 14. The main filter unit 12 is securely and permanently retained in its operative position shown by means of a header, indicated in its entirety by 15, spanning the annular space between the lower end portion of the intake conduit 10 and the lower portion of the outer shell section 1 and secured to the conduit 10 and shell section 1 by soldering, welding, or the like.

The header 15 comprises concentrically disposed inner and outer baffle portions, respectively, indicated by 16 and 17 connected by circumferentially spaced radially extending connector portions 18. Since the space between the annular inner and outer portions 16 and 17 of the header 15 is interrupted only by the connector portions 18, said space may be considered as providing a generally annular or substantially annular passage 19. The baffle-acting inner portion 16 of the header 15 is downwardly and inwardly extended toward the discharge end of the intake conduit 10 to define an annular shoulder or seat 20 and said portion 16, which is otherwise imperforate, is cut out immediately adjacent the intake conduit 10 to provide a generally annular liquid return passage made up of circumferentially spaced segmental sections 21.

The inner cup 5 is formed at its radially outer portion below the header 15 to define an annular seat or shoulder 22. Below the plane of the annular seat or shoulder 22 the inner cup is formed to define a generally horizontally disposed annular portion 23 which is cut out and pressed out to provide a circumferentially spaced series of segmental liquid metering passages 24 and downwardly and outwardly directed louver-like flanges 25. Below the plane of the annular portion 23 the inner cup 5 is formed to provide an inwardly directly annular step 26.

The auxiliary filter is indicated as an entirety by 27 and is shown best in Figs. 1, 4 and 5. This auxiliary filter is of annular form and comprises super-imposed fine mesh woven wire screens 28 and a sheet metal screen retainer, which latter comprises a folded outer annular portion 29, a relatively wide baffle-acting inner portion 30 that is folded over and around the inner marginal edge of the annular screens 28 at 31; the folded annular edge portions 29 and 31 being tightly crimped about the screens. By reference particularly to Fig. 4, it will be seen that the screen retainer further comprises radially extended connector portions 32 connecting the annular outer and inner portions 29 and 30.

The inner annular portion 30 of the auxiliary filter 27 is upwardly seated against the discharge end of the air intake conduit 10, as shown best in Fig. 1, and the outer annular portion 29 of the screen retainer is downwardly seated against the seat or shoulder 22 of the inner cup 5, as also best shown in Fig. 1. When the inner cup 5 is in operative position, as shown in Fig. 1, the seat or shoulder 22 exerts sufficient upward pressure on the outer portion of the auxiliary filter to produce an upward conical flexing thereof which maintains the inner portion of the auxiliary filter 27 snugly seated against the discharge end of the intake conduit 10. By reference particularly to Fig. 1, it will be further seen that the axial opening, indicated by 33, through the screen retainer of the auxiliary filter 27, is of somewhat less diameter than the internal diameter of the intake conduit 10 so that, when the auxiliary filter 27 is employed, it automatically imposes an air flow restriction at the discharge end of the intake conduit 10 which produces an increased air velocity at this point. By still further reference to Fig. 1 it will be seen that the relatively wide annular inner portion 30 of the auxiliary filter screen retainer extends from the axial opening or passage 30 radially outwardly beyond the seat or shoulder 20 of the header 15 and that the said retainer portion 30 and adjacent portions of the screens 28 are formed with an upwardly and outwardly directed step providing a shoulder 34 that snugly seats against the seat or shoulder 20 of the header 15. Hence, the auxiliary filter engages and makes annular sealing contact with the header 15 radially outwardly of the header and liquid return passages 21. Now, by still further reference to Fig. 1, it will be seen that the otherwise imperforate annular portion 30 of the auxiliary filter screen retainer is provided immediately adjacent the air intake conduit 10 with a generally annular liquid return passage comprising a plurality of circumferentially spaced segmental passage sections 35. The outer marginal edges of these liquid return passages 35 are preferably defined by downwardly and inwardly directed louvers or flanges 36.

*Operation*

As indicated above, under normal or most usually encountered conditions when air contaminants consist largely or wholly of earthen dust, the cleaner will be operated with the auxiliary filter 27 removed. Hence, first to be considered will be the operation of the cleaner illustrated without the auxiliary filter. From the drawings it will be apparent that the auxiliary filter 27 is upwardly displaceable from the inner cup 5 upon removal of the inner cup 5 and outer cup 3 from the shell section 1, at which time the inner cup 5 is upwardly removable from the outer cup 3. Assuming now that the outlet port 11 of the cleaner is connected to the intake system of an internal combustion engine or corresponding air-consuming device, the operation of the cleaner independently of the auxiliary filter 27 will be substantially as follows: Under engine operating conditions contaminated air will flow downwardly through the intake conduit 10 and will be discharged downwardly into the liquid reservoir defined by the outer cup 3 and toward the bottom of the inner cup 5 and impinged against reservoir contained liquid. As previously indicated, the reservoir will usually be filled with liquid to a static level indicated on Fig. 1 as being coincident with section line 3—3. After being discharged from the intake conduit 10 the air will reverse its direction within the inner cup 5 and will pass radially outwardly and upwardly through the segmental passage sections 19 of the header 15 and into and through the main filter unit or element 12 into the annular discharge chamber 14 and through the outlet port 11 to the engine's intake system of which the cleaner is a part. Most of the oil initially contained in the inner cup 5 will be entrained in the air stream and carried into the main filter unit 12. The rapidly moving air column, of course, expands rapidly within the inner cup 5 immediately adjacent the discharge end of the intake conduit 10 and further expands within the chamber containing the main filter unit 12. The dust particles and other contaminants carried by the air are thoroughly wetted with oil and the contaminated air is subjected to a thorough scrubbing action as it passes through the filter 12. The baffle-acting inner annular portion 16 of the header 15 creates a quiescent liquid collecting zone thereabove within the main filtering element or unit 12 surrounding the intake conduit 10 and the generally annular imperforate outer marginal portion 17 of the header 15 produces a second quiescent liquid collecting zone above the header immediately adjacent the shell section 1. As the air passes upwardly through the main filter element 12 it progressively expands in an upwardly direction and oil and entrapped contaminants are thrown out of the main air column into the above described inner and outer quiescent liquid collecting zones above the header 15, so that the air discharged from the clean air outlet port 11 is oil free and substantially free of contamination. Under normal operating conditions there will be a rather solid head of oil built up within the annular chamber containing the filter unit 12 above the imperforate inner portion 16 of the header 15 and above the imperforate outer portion 17 of the header 15. Because the air column expands rapidly upon its discharge from the intake conduit 10, there is produced within the liquid reservoir immediately adjacent the discharge end of the intake conduit 10, a low pressure zone or area underlying the liquid return passages 21 of the header 15. Hence, under most operating conditions the air pressure immediately below the liquid return passage or passages 21 of the header 15 will be somewhat lower than that in the filtering and expansion chamber immediately overlying the liquid return passages 21 which will result in a relatively continuous downward return flow of oil from the quiescent zone above the passage or passages 21 to the underlying portion of the liquid reservoir immediately adjacent the discharge end of the intake conduit 10. A large percentage of the oil thus returned to the reservoir through the return passage 21 will be re-entrained in the air column and re-circulated upwardly into the filter unit 12 and back to the reservoir, thereby producing a continuous circulation of liquid into and out of the main filter element 12. Liquid collected in the quiescent zone immediately above the annular outer portion 17 of the header 15 flows downwardly over the outer marginal edge portions of the generally annular passage 19 of the header 15 and through the radially outer portions of the metering inner cup passage or passages 24. Under operating conditions the space between the outer cup 3 and the inner cup 5 is maintained quite well filled with liquid and there is, in addition to the inward flow of liquid through the outer portion of the metering passage 24, an outward and upward flow of oil through the inner portions of the metering passage or passages 24 into the upwardly directed main air stream or column wherein it is entrained and carried back into the filter element 12; this outward and upward flow of oil through the metering passage or passages 24 being brought about or encouraged by virtue of the step formation 26 of the inner cup 5 which causes an air expansion immediately thereabove and adjacent the metering passage or passages 24. Particularly it should be borne in mind that through control of well-known design factors, the air pressures above and below the liquid return passages 21 of the header 15 are so balanced as to maintain a relatively continuous circulation of liquid from the liquid reservoir upwardly into the main filter unit 12 and back to the reservoir through the return passages 21 when the cleaner is operated without the auxiliary filter 27.

Now to be considered is the operation of the cleaner with the auxiliary filter unit or element 27 in its operative position shown in Fig. 1 and which will generally be for only brief and relatively abnormal periods when the air contains, in addition to normally encountered earthen dust, a relatively high percentage of fibrous substance, usually of vegetable origin, that would tend to become permanently lodged in and ultimately plug or unduly restrict the main filter unit 12. The woven wire screens 28 of the auxiliary filter unit 27 must be fine enough mesh to intercept from the air stream any fibrous material. Hence, this auxiliary filter does essentially impose a considerable additional air flow restriction and, in fact, a sufficient additional restriction to upset the above described air pressure balance responsible for maintaining the described relatively continuous circulation of liquid downwardly through the return passage or passages 21 of the header 15. However, and as also previously indicated, the auxiliary filter itself is provided with means for automatically re-establishing a new pressure balance whereby, in the presence of the added restriction imposed by the screens 28 of the auxiliary filter 27, this essential continuous circulation of liquid from the liquid collecting quiescent zone above the liquid return passage 21 downwardly through said passage 21 to the liquid reservoir is restored. This means comprises that part of the imperforate marginal edge 30 of the auxiliary filter screen retainer projecting inwardly of the inside surface of the intake conduit 10 and restricting flow through the discharge end of said conduit. By virtue of this added restriction the pressure adjacent the discharge end of the intake conduit 10 and adjacent the return passage 35 of the auxiliary filter is reduced sufficiently to produce a continuous downward flow of liquid through the return passage 21 of the header 15 and the return passage 35 of the auxiliary filter 27. Hence, the operation of the air cleaner is substantially the same when the auxiliary filter is employed as is the case when the cleaner is operated with the auxiliary filter removed, except for the fact that the over-all restriction imposed by the air cleaner is greater when the auxiliary filter is employed. Of course, the auxiliary filter should be removed and cleaned frequently.

The over-all efficiency of the cleaner with the auxiliary filter installed is further improved by incorporation of the louver-like flange or lip portion 36 defining the outer marginal edge portions of the return passages.

What we claim is:

1. In a wet-type air cleaner, an outer shell comprising a generally vertically disposed tubular main body section having a closed upper end and an open lower end, said outer shell further comprising a downwardly displaceable cup-like bottom section defining a liquid reservoir adapted to contain liquid to an established static level and when in operative position closing the open bottom end of said main body section, a center air intake conduit carried by the main body of the outer shell and leading through the closed upper end portion thereof and generally axially downwardly therethrough and having its bottom discharge end disposed in upwardly spaced relation to the bottom of said displaceable cup-like bottom section, said center air intake conduit being radially spaced from and generally parallel to the tubular main body section to define therewith a generally annular air filtering and liquid condensing chamber leading upwardly from the liquid reservoir, generally annular air filtering and liquid condensing means in said generally annular chamber, a clean air outlet leading from the upper portion of said annular chamber, an annular baffle concentrically disposed about the lower end portion of the air intake conduit and underlying the radially inner portion of said filtering and condensing means, said annular baffle being constructed and arranged to deflect upwardly moving air radially outwardly of the center air intake conduit to provide a quiescent zone about said conduit in the filtering and condensing chamber adjacent the lower end portion of said conduit for collection of a head of liquid condensed out of the main air stream passing upwardly through said chamber and to allow relatively free passage of air to the radially intermediate portions of the filtering and condensing chamber, the air stream expanding upon leaving the discharge end of the intake conduit and thereby producing a low pressure zone adjacent the discharge end of said conduit and below said baffle, a liquid return passage defined at least in part by said annular baffle and located closely adjacent the air intake conduit and leading from said quiescent zone above the baffle to the underlying low pressure zone adjacent the discharge end of the intake conduit, under operative conditions the air pressure balance between areas adjacent the upper and lower ends of said baffle liquid return passage being such as to maintain a relatively constant downward flow of condensed liquid through said return passage for the remixing with the air stream passing from the discharge end of the intake conduit to the filtering and condensing chamber, and an optionally usable auxiliary filter unit spanning the annular space between the discharge end portion of the air intake conduit and the tubular body of the outer shell below said baffle, said auxiliary filter unit comprising a generally imperforate annular inner marginal edge portion and an air pervious outer portion, said relatively imperforate marginal edge portion underlying said annular baffle and liquid return passage and the discharge end of the intake conduit and being seated against the open end of the latter and being seated against the former in radially outwardly spaced relation to said liquid return passage, and a liquid return passage through said generally imperforate marginal inner edge portion of the auxiliary filter unit and communicating with the first said liquid return passage, the generally imperforate portion of the auxiliary annular filter unit defining a central opening disposed concentrically with respect to the center air intake conduit and of such lesser diameter than the internal diameter of said conduit as to so increase air velocity immediately adjacent the discharge end of the intake conduit and to so further reduce the pressure below said liquid return passages as to thereby re-establish, in the presence of the added air flow restriction introduced by the auxiliary filter unit, a pressure balance capable of maintaining a relatively constant downward flow of liquid through said return passages from the quiescent zone above said baffle to the low pressure zone below the liquid return passage of the auxiliary filter unit.

2. The structure defined in claim 1 in which said liquid return passages are generally annular.

3. The structure defined in claim 1 in which said liquid return passages are generally annular and each comprise a plurality of generally segmental sections.

4. The structure defined in claim 1 in which said liquid return passages each comprise a plurality of circumferentially spaced sections.

5. The structure defined in claim 1 in which the said liquid return passage of the auxiliary filter unit is of reduced area with respect to the area of the overlying liquid return passage of said baffle.

6. The structure defined in claim 1 in which the liquid return passage of the auxiliary filter unit is generally annular and has its outer marginal edge defined by a downwardly and inwardly directed lip for directing returned liquid toward the air stream discharged from the intake conduit.

7. The structure defined in claim 1 in which the cup-like displaceable bottom section of the outer shell carries radially inwardly projecting stop shoulder means below the plane of the bottom of said filtering and condensing means, and wherein the radially outer marginal edge portion of said auxiliary filter unit is downwardly seated upon said stop shoulder means with freedom for upward displacement from said cup-like displaceable shell bottom section when the latter is removed from the main body section.

8. The structure defined in claim 1 wherein the said liquid return passage of the auxiliary filter unit is generally annular.

9. The structure defined in claim 1 wherein the said liquid return passage of the auxiliary filter unit is generally annular and comprises a plurality of generally segmental sections.

10. The structure defined in claim 1 wherein the said liquid return passage of the auxiliary filter unit is generally annular, and wherein the outer marginal edge portion of said generally annular passage is defined by a downwardly and radially inwardly directed lip for directing returned liquid toward the high velocity air stream discharged from the intake conduit.

11. In a wet-type air cleaner, an outer shell comprising a generally vertically disposed tubular main body section having a closed upper end and an open lower end, said outer shell further comprising a downwardly displaceable cup-like bottom section defining a liquid reservoir adapted to contain liquid to an established static level, an air intake conduit leading downwardly through the outer shell and having a downwardly directed lower discharge end spaced from the bottom of the reservoir, portions of said air intake conduit lying in laterally spaced generally parallel relation to portions of the tubular main body of the outer shell and defining therewith an upwardly directed filtering and condensing chamber, air filtering and liquid condensing means in said chamber, an air outlet from the upper portion of said chamber above said means, a baffle associated with the lower end portion of the intake conduit in underlying relationship to said filtering and condensing means and constructed and arranged to deflect upwardly moving air outwardly of the intake conduit to provide a quiescent liquid collecting zone in said chamber adjacent the intake conduit and above said baffle and to allow relatively free passage of air to the intermediate portion of the liquid filtering and condensing means, the air stream expanding adjacent the discharge end of the intake conduit to produce a low pressure zone adjacent the conduit below said baffle, a liquid return passage defined at least in part by said baffle and located closely adjacent said conduit and leading from said quiescent zone above the baffle in said chamber to the underlying low pressure zone, under operative conditions the air pressure balance between areas immediately adjacent the upper and lower ends of said baffle liquid return passage being such as to maintain a relatively constant downward flow of condensed liquid from the quiescent liquid collecting zone above the baffle to the low pressure zone adjacent the discharge end of the intake conduit for remixing with the air stream discharged from the end of the intake conduit, and an optionally usable auxiliary filter unit spanning the space between the discharge end portion of the intake conduit and the tubular body of the outer shell below said baffle, said auxiliary filter unit comprising a generally imperforate marginal edge portion adjacent said conduit and an air pervious outer portion through which air must pass to reach said chamber, shoulder means carried by the displaceable cup-like bottom section of the outer shell upon which outer marginal edge portions of the auxiliary filter unit are downwardly seated and from which the auxiliary filter unit is upwardly displaceable when said cup-like bottom section is removed from the main tubular body section of the outer shell, the said generally imperforate marginal edge portion of the auxiliary filter unit being upwardly seated against the discharge end of the intake conduit and projecting inwardly and outwardly of the engaged portion of said conduit, the outwardly projecting part of said relatively imperforate portion of the auxiliary filter unit underlying the before-said liquid return passage and the adjacent portion of said baffle and being upwardly seated against said baffle outwardly of said return passage, and a liquid return passage through said relatively imperforate portion of the auxiliary filter unit orientated to provide communication between the first mentioned return passage and the low pressure zone adjacent the discharge end of the intake conduit, the inwardly projecting part of said relatively imperforate portion of the auxiliary filter unit restricting the intake conduit to increase the velocity of the air stream discharged from said conduit and thereby produce a further lowering of pressure in the low pressure zone adjacent the discharge end of said conduit, the added restriction to air flow created by said optionally usable auxiliary filter unit tending to reduce the pressure above said auxiliary filter and upset the before-described air pressure balance and the said added restriction and resultant increased air velocity at the discharge end of said conduit provided by said relatively imperforate portion of the auxiliary filter unit causing a further lowering of pressure in said low pressure zone to re-establish a pressure balance that will maintain a relatively constant downward flow of liquid through the first and second said liquid return passages in the presence of the added restriction to air flow resulting from use of the auxiliary filter unit.

12. In a wet-type air cleaner, an outer shell comprising a generally vertically disposed tubular main body section having a closed upper end and an open lower end, said outer shell further comprising a downwardly displaceable cup-like bottom section defining a liquid reservoir adapted to contain liquid to an established static level and when in operative position closing to open bottom end of said main body section, a center air intake conduit carried by the main body of the outer shell and leading through the closed upper end portion thereof and generally axially downwardly therethrough and having its bottom discharge end disposed in upwardly spaced relation to the bottom of said displaceable cup-like bottom section, said center air intake conduit being radially spaced from and generally parallel to the tubular main body section to define therewith a generally annular air filtering and liquid condensing chamber leading upwardly from the liquid reservoir, generally annular air filtering and liquid condensing means in said generally annular chamber, a clean air outlet leading from the upper portion of said annular chamber, the cup-like displaceable bottom section of the outer shell carrying radially inwardly projecting stop shoulder means below the plane of the bottom of said filtering and condensing means, a thin annular auxiliary filter unit spanning the lower end portion of said generally annular filtering and condensing chamber below the filtering and condensing means and having a central passage therethrough registering with the internal diameter of the central air intake conduit, the radially outer portion of said auxiliary filter unit being downwardly seated upon said stop shoulder means with freedom for upward displacement from the cup-like displaceable shell bottom section when the latter is removed from the main body section and said auxiliary filter unit having its radially inner portion adjacent its central passage upwardly seated against the lower end of the center air intake conduit under pressure causing a conical downward flexing of the central portion of said auxiliary filter unit when the displaceable cup-like bottom section is in its operative position and being downwardly displaceable with the displaceable bottom shell section when the latter is downwardly displaced from the main body section, said auxiliary filter unit comprising a generally imperforate inner marginal edge portion, said generally imperforate inner marginal edge portion underlying the lower end of the air intake conduit and projecting radially inwardly of the adjacent inner surface of the air intake conduit to provide a material air velocity increasing restriction and resultant materially reduced pressure in the area adjacent the discharge end of the central air intake conduit and the central passage through the auxiliary filter unit, said generally imperforate marginal edge portion projecting radially outwardly of the outer surface of the air intake conduit to create a quiescent liquid-collecting zone in the overlying portion of the annular filtering and condensing chamber adjacent said air intake conduit, and a restricted oil return passage leading downwardly through said generally imperforate inner marginal portion of the auxiliary filter unit from the quiescent liquid-collecting zone of the filtering and condensing chamber to said reduced pressure area adjacent the bottom end of the air intake conduit.

13. In a wet-type air cleaner, an outer shell comprising a generally vertically disposed tubular main body section having a closed upper end and an open lower end, said outer shell further comprising a downwardly displaceable cup-like bottom section defining a liquid reservoir adapted to contain liquid to an established static level, an air intake conduit leading downwardly through the outer shell and having a downwardly directed lower discharge end spaced from the bottom of the reservoir, portions of said air intake conduit lying in laterally spaced generally parallel relation to portions of the tubular main body of the outer shell and defining therewith an upwardly directed filtering and condensing chamber, air filtering and liquid condensing means in said chamber, an air outlet from the upper portion of said chamber above said means, the cup-like displaceable bottom section of the outer shell carrying an inwardly projecting stop shoulder, a thin auxiliary filter unit spanning the lower end portion of said filtering and condensing chamber below said filtering and condensing means, said auxiliary filter unit having a marginal edge portion underlying and upwardly seated against the open discharge end of the intake conduit with freedom for downward displacement therefrom with the cup-like bottom section when the latter is downwardly displaced from the main body section and having another marginal edge portion downwardly seated upon said bottom section carried stop shoulder with freedom for upward displacement therefrom when the cup-like bottom section is removed from the tubular main body section, said auxiliary filter unit comprising a generally imperforate inner marginal edge portion that underlies and is upwardly seated against the lower discharge end of the intake conduit and projects radially outwardly of the outer surface of the air intake conduit to create a quiescent liquid-collecting zone thereabove adjacent the air intake conduit, said generally imperforate marginal edge portion of the auxiliary filter unit having an air passage therethrough registering with the interior of the intake conduit and having a restricted liquid return passage leading downwardly therethrough from said quiescent liquid-collecting zone to the area adjacent the discharge end of said air passage, the said generally imperforate marginal edge portion of the auxiliary filter unit projecting inwardly of the inner surface of the air intake conduit to provide a material air velocity increasing restriction and resultant reduced air pressure in the area adjacent the discharge end of said air passage through its said generally imperforate marginal edge portion.

References Cited in the file of this patent
UNITED STATES PATENTS

| | | |
|---|---|---|
| 2,387,278 | Lowther | Oct. 23, 1945 |
| 2,397,525 | Bennett | Apr. 2, 1946 |
| 2,574,011 | Blair et al. | Nov. 6, 1951 |
| 2,627,935 | Beach | Feb. 10, 1953 |
| 2,694,465 | Lowther | Nov. 16, 1954 |
| 2,701,029 | Fier | Feb. 1, 1955 |